United States Patent
Lee et al.

(10) Patent No.: US 11,874,594 B2
(45) Date of Patent: Jan. 16, 2024

(54) CAMERA MODULE

(71) Applicant: SAMSUNG ELECTRO-MECHANICS CO., LTD., Suwon-si (KR)

(72) Inventors: Jae Hyuk Lee, Suwon-si (KR); Soo Cheol Lim, Suwon-si (KR); Byung Woo Kang, Suwon-si (KR); Young Bok Yoon, Suwon-si (KR); Jong Woo Hong, Suwon-si (KR); Jung Seok Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 245 days.

(21) Appl. No.: 17/069,134

(22) Filed: Oct. 13, 2020

(65) Prior Publication Data

US 2021/0247663 A1     Aug. 12, 2021

(30) Foreign Application Priority Data

Feb. 10, 2020 (KR) .................. 10-2020-0015811

(51) Int. Cl.
*G03B 5/00* (2021.01)
*G02B 27/64* (2006.01)

(52) U.S. Cl.
CPC ............. *G03B 5/00* (2013.01); *G02B 27/646* (2013.01); *G03B 2205/0007* (2013.01)

(58) Field of Classification Search
CPC ............ G03B 5/00; G03B 2205/0007; G03B 2205/0015; G03B 2205/0069; G03B 3/10; G03B 5/02; G03B 30/00; G03B 17/02; G03B 17/12; G02B 27/646; G02B 7/09; H04N 5/2251; H04N 5/2252; H04N 5/2254

See application file for complete search history.

(56) References Cited

U.S. PATENT DOCUMENTS

| | | |
|---|---|---|
| 9,578,242 B2 | 2/2017 | Kang et al. |
| 2011/0026915 A1 | 2/2011 | Baik et al. |
| 2013/0142502 A1 | 6/2013 | Kang et al. |
| 2015/0296143 A1* | 10/2015 | Kang ............... G03B 17/12 348/208.11 |

(Continued)

FOREIGN PATENT DOCUMENTS

| | | |
|---|---|---|
| CN | 103135312 A | 6/2013 |
| CN | 104977776 A | 10/2015 |

(Continued)

OTHER PUBLICATIONS

Machine Translation of JP-2018173572-A (Year: 2018).*

(Continued)

*Primary Examiner* — Darryl J Collins
*Assistant Examiner* — Matthew Y Lee
(74) *Attorney, Agent, or Firm* — NSIP Law

(57) ABSTRACT

A camera module includes a housing, a movable body configured to move in a direction of an optical axis of the housing; a reinforcing member formed integrally on one surface of the movable body, and configured to increase a rigidity of the movable body; and a first buffer member formed in the reinforcing member, and configured to reduce an impactive force between the housing and the movable body.

14 Claims, 12 Drawing Sheets

(56) References Cited

U.S. PATENT DOCUMENTS

| | | | |
|---|---|---|---|
| 2015/0346587 A1 | 12/2015 | Lim et al. | |
| 2017/0139225 A1 | 5/2017 | Lim | |
| 2017/0330847 A1 | 11/2017 | Dobashi et al. | |
| 2018/0356609 A1* | 12/2018 | Kim | G02B 7/04 |
| 2019/0179107 A1 | 6/2019 | Hsu et al. | |
| 2019/0235205 A1 | 8/2019 | Ichihashi | |
| 2020/0041811 A1 | 2/2020 | Zhang et al. | |
| 2020/0050084 A1 | 2/2020 | Lim et al. | |
| 2022/0163089 A1* | 5/2022 | Kim | G03B 5/00 |

FOREIGN PATENT DOCUMENTS

| | | | | |
|---|---|---|---|---|
| CN | 105319803 A | | 2/2016 | |
| CN | 106707454 A | | 5/2017 | |
| CN | 108319093 A | | 7/2018 | |
| CN | 209930372 U | | 1/2020 | |
| JP | 2006-180094 A | | 7/2006 | |
| JP | 2006180094 A | * | 7/2006 | G11B 25/04 |
| JP | 2011-99901 A | | 5/2011 | |
| JP | 2016-45283 A | | 4/2016 | |
| JP | 2018-173572 A | | 11/2018 | |
| JP | 2018173572 A | * | 11/2018 | G03B 5/00 |
| KR | 10-2011-0011192 A | | 2/2011 | |
| KR | 10-2015-0118008 A | | 10/2015 | |
| KR | 10-2017-0005399 A | | 1/2017 | |
| KR | 10-1693462 B1 | | 1/2017 | |
| KR | 10-2018-0015966 A | | 2/2018 | |
| WO | WO 2018/035945 A1 | | 3/2018 | |

OTHER PUBLICATIONS

Machine Translation of JP-2006180094-A (Year: 2006).*
Korean Office Action dated Oct. 14, 2020 issued in counterpart to Korean Patent Application No. 10-2020-0015811 (7 pages in English, 5 pages in Korean).
Chinese Office Action issued on Aug. 22, 2022, in counterpart Chinese Patent Application No. 202011580115.4 (14 pages in English and 14 pages in Chinese).

* cited by examiner

I - I

II-II

III-III

IV-IV

CAMERA MODULE

CROSS-REFERENCE TO RELATED APPLICATION(S)

This application claims the benefit under 35 USC § 119(a) of Korean Patent Application No. 10-2020-0015811, filed on Feb. 10, 2020, in the Korean Intellectual Property Office, the entire disclosure of which is incorporated herein by reference for all purposes.

BACKGROUND

1. Field

The following description relates to a camera module.

2. Description of Related Art

A camera module mounted on a portable terminal may be configured to enable focus adjustment (AF) driving and optical image stabilization (OIS) driving. For example, the camera module may be configured to move a lens barrel in a direction of an optical axis and in a direction that intersects the optical axis. The lens barrel may be maintained in position within the camera module by an elastic member or magnetic force. For example, the lens barrel may be maintained at a constant height from a bottom of a housing by a plurality of steel wires, or may be maintained in a constant position by a magnet and a coil for an AF driving or an OIS driving. However, since the above-described structure may not suppress shaking of the lens barrel due to external impacts, internal noise of the camera module and malfunctioning of the camera module may occur due to the shaking of the lens barrel.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a camera module includes a housing, a movable body, configured to move in a direction of an optical axis of the housing; a reinforcing member formed integrally on one surface of the movable body, and configured to increase a rigidity of the movable body; and a first buffer member formed in the reinforcing member, and configured to reduce an impactive force between the housing and the movable body.

The camera module may further include a fastening hole configured to fit the first buffer member is formed in the reinforcing member.

The movable body may include a first frame configured to move in a direction of the optical axis; a second frame, disposed on the first frame, and configured to move in a first direction, that intersects the optical axis; and a third frame, disposed on the second frame, and configured to move in a direction of the optical axis and in a second direction, that intersects the optical axis.

The camera module may include a cover member, configured to engage with the first frame when the second frame and the third frame are mounted, such that the second frame and the third frame do not deviate from the first frame.

The camera module may include a second buffer member formed on the cover member.

The camera module may include a ball bearing disposed between the first frame and the second frame, and disposed between the second frame and the third frame.

The camera module may include a first driving unit, configured to move the first frame in a direction of the optical axis; and second driving units, configured to move the second frame and the third frame in a direction that intersects the optical axis.

The first driving unit may include a first driving coil disposed on a first surface of the housing; and a first driving magnet disposed on a first surface of the first frame.

The second driving units may include second driving coils respectively disposed on a second surface of the housing and a third surface of the housing; and second driving magnets respectively disposed on a second surface of the third frame and a third surface of the third frame.

The camera module may include a substrate on which the first driving coil and the second driving coil are arranged, and the substrate may be configured to surround the first surface of the housing, the second surface of the housing, and the third surface of the housing.

In a general aspect, a camera module includes a housing; a movable body, configured to move in a direction of an optical axis of the housing; a first driving unit, configured to move the movable body in a direction of the optical axis; second driving units, configured to move the movable body in first and second directions that intersect the optical axis; an auxiliary yoke, formed integrally on the movable body, and configured to interact with the first driving unit and the second driving unit, to move the movable body based on the first driving unit and the second driving unit; and a first buffer member formed on the movable body, and configured to reduce an impactive force between the housing and the movable body.

The camera module may include a reinforcing member formed integrally on the movable body and configured to have a fastening hole engaged with the first buffer member.

The camera module may further include a first ball bearing disposed between the housing and the movable body.

The movable body may include a first frame configured to move in a direction of the optical axis; a second frame, disposed on the first frame, and configured to move in a first direction, that intersects the optical axis; and a third frame, disposed on the second frame, and configured to move in a direction of the optical axis and in a second direction, that intersects the optical axis.

The camera module may include a second buffer member disposed between the first frame and the second frame, and disposed between the second frame and the third frame.

In a general aspect a camera module includes a first frame, configured to move in a direction of an optical axis; a second frame, disposed on the first frame, and configured to move in a first direction that intersects the optical axis; a third frame, disposed on the second frame, and configured to move in a second direction that intersects the optical axis; a cover member, configured to bind the second frame and the third frame to the first frame; and one or more first buffer members, formed in the cover member, and configured to reduce impact forces between a housing and the first, second, and third frames.

The camera module may include a reinforcing member that is integrally formed on the first frame, and one or more second buffer members formed in the reinforcing member, and configured to reduce impact forces between the first frame and the housing.

The camera module may include a first driving unit configured to drive the first frame in the optical axis direction, a second driving unit configured to drive the second frame in the first direction, and a third driving unit configured to drive the third frame in the second direction.

The third frame may be further configured to move in the direction of the optical axis.

The reducing the impact forces may include absorbing the impact forces between the housing and the first, second, and third frames.

Other features and aspects will be apparent from the following detailed description, the drawings, and the claims.

Figure 1:
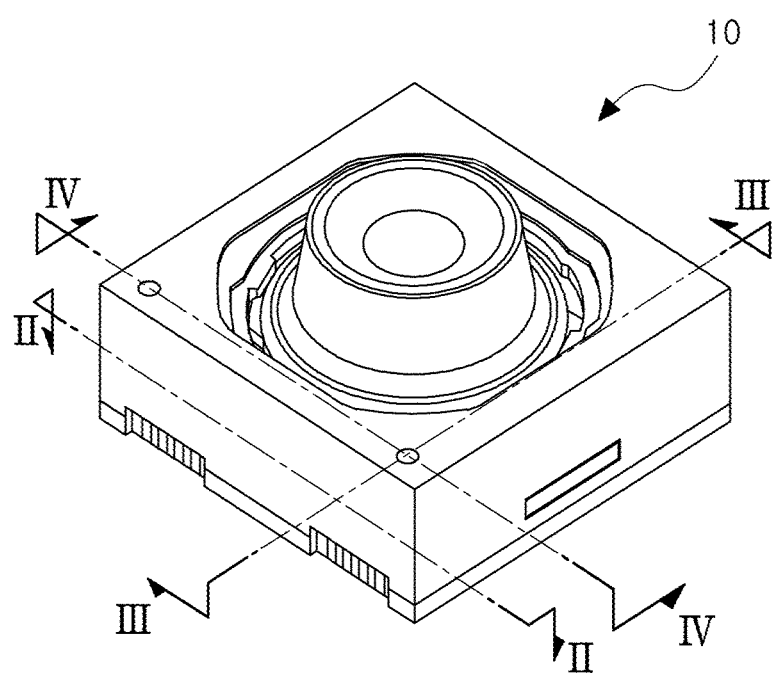
FIG. 1 is a perspective view of an example camera module, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains after an understanding of the disclosure of this application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

A configuration of an example camera module, in accordance with one or more embodiments, will be described with reference to FIGS. 1 and 2.

A camera module 10, in accordance with one or more embodiments, may be mounted in a portable electronic device, or a communication terminal. In a non-limiting example, the camera module 10 may be mounted on a mobile phone, a laptop computer, or similar device. A use range of the camera module 10 according to an example is not limited to the above-mentioned electronic devices. In an example, the camera module 10 may be mounted in, as non-limited examples, an automated teller machine (ATM), a television for interactive broadcasting, or similar devices.

Figure 2:
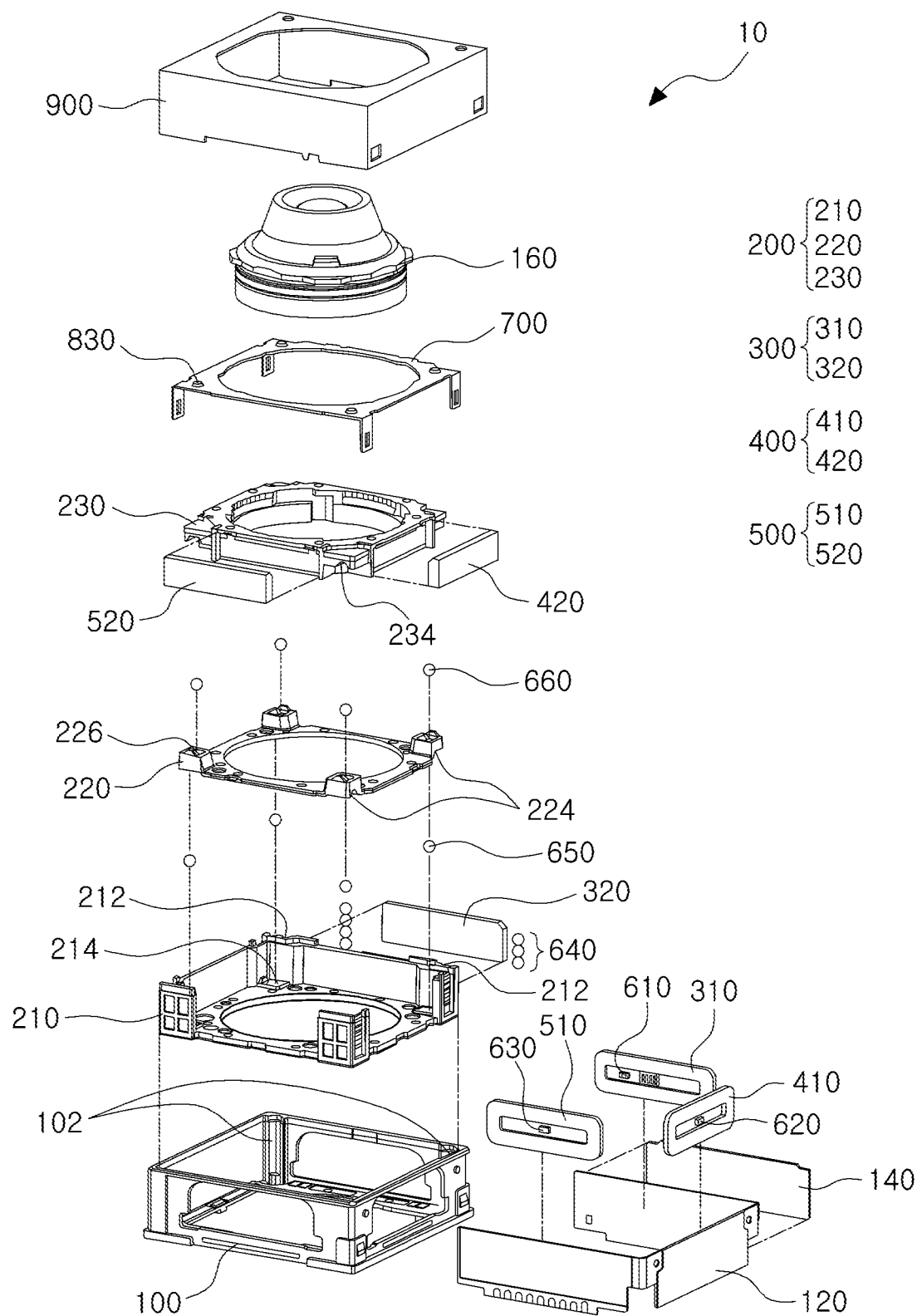
FIG. 2 is an exploded perspective view of the example camera module illustrated in FIG.

Referring to FIG. 2, the camera module 10 may include a housing 100, a lens barrel 160, a lens module 200, a first driving unit 300, and second driving units 400 and 500, as illustrated in FIG. 2. A configuration of the camera module 10 is not limited to the above-mentioned members. For example, the camera module 10 may further include a substrate 120, a yoke 140, position detecting sensors 610, 620, and 630, ball bearings 640, 650, and 660, a cover member 700, a reinforcing member 810, and a shield can 900.

The housing 100 may be formed as a cube having open upper and lower surfaces. For example, the housing 100 may be configured in a substantially hexahedral shape. Three (3) side surfaces of the housing 100 may be partially incised. Driving force of a first driving unit 300, and second driving units 400 and 500, may be transmitted to a movable body 200 through the incised side surfaces. A pair of first guide grooves 102 may be formed inside a first surface of the housing 100. The first guide groove 102 may be formed to be elongated in a height direction of the housing 100. A first ball bearing 640 may be disposed in the first guide groove 102.

The movable body 200 may be disposed inside the housing 100. The movable body 200 may be configured to move in a direction of an optical axis and in a direction intersecting the optical axis within the housing 100. The movable body 200 may be comprised of a plurality of members. For example, the movable body 200 may be comprised of a first frame 210, a second frame 220, and a third frame 230.

The first frame 210 may be formed to be open in a vertical direction and to have two (2) closed side surfaces and two (2) open side surfaces. A pair of second guide grooves 212 may be formed on a first surface of the first frame 210. The first ball bearing 640 may be disposed in the second guide groove 212. The first frame 210 may be disposed inside the housing 100. The first frame 210 may be configured to move in a direction of an optical axis with respect to the housing 100. For example, the first frame 210 may be in point contact, with or in line contact with, the first ball bearing 640 to move in a direction of the optical axis. Driving force required for driving the first frame 210 may be provided by the first driving unit 300. A first groove 214 may be formed in four (4) internal corners of the first frame 210. The first groove 214 may have a shape having a longitudinal direction. For example, the first groove 214 may be formed to be elongated in a first direction, intersecting the optical axis. A second ball bearing 650 may be disposed in the first groove 214.

The second frame 220 may have a generally thin plate shape in which the vertical direction is open. The second frame 220 may be disposed on the first frame 210, and may be configured to move in the first direction, that intersects the optical axis. For example, the second frame 220 may move in the first direction, intersecting the optical axis based on an interaction with the second ball bearing 650 disposed between the first frame 210 and the second frame 220. Driving force required for driving the second frame 220 may be provided by the second driving unit 400. A second groove 224 and a third groove 226 may be formed in the second frame 220. The second groove 224 may be formed in a lower portion of the second frame 220, and the third groove 226 may be formed in an upper portion of the second frame 220. The second groove 224 may be formed to be elongated in the first direction, intersecting the optical axis. The second groove 224 may form a space for accommodating the second ball bearing 650, together with the first groove 214. The third groove 226 may be formed to be elongated in a second direction, intersecting the optical axis and the first direction.

The third frame 230 may be formed to be open in the vertical direction and to have a predetermined height. The third frame 230 may be disposed on the second frame 220, and may be configured to move in the second direction, intersecting the optical axis. For example, the third frame 230 may move in a second direction, intersecting the optical axis based on an interaction with a third ball bearing 660 disposed between the second frame 220 and the third frame 230. Driving force needed to drive the third frame 230 may be provided by the second driving unit 400. A fourth groove 234 may be formed in a lower portion of the third frame 230. The fourth groove 234 may be formed to be elongated in the second direction, intersecting the optical axis. The fourth groove 234 may form a space for accommodating the third ball bearing 660, together with the third groove 226.

The lens barrel 160 may be combined with the third frame 230. The lens barrel 160 may be moved by the movable body 200 in a direction of the optical axis, and in a direction that intersects the optical axis. In an example, the lens barrel 160 may move in a direction of the optical axis based on a movement of the first frame 210. In another example, the lens barrel 160 may move in the first and second directions, intersecting the optical axis, based on a movement of the second frame 220 and a movement of the third frame 230. Movement of the lens barrel 160 in a direction of the optical axis may enable focus adjustment of the camera module 10, and movement of the lens barrel 160 in a direction intersecting the optical axis of the camera module 10 may allow for an optical image stabilization (OIS) function of the camera module 10.

The first driving unit 300 may be configured to move the movable body 200 in a direction of the optical axis. In an example, the first driving unit 300 may provide the driving force necessary to move the movable body 200 in a direction of the optical axis of the first frame 210. The first driving unit 300 may include a first driving coil 310 and a first driving magnet 320. The first driving coil 310 may be disposed on the first surface of the housing 100, and the first driving magnet 320 may be disposed on the first surface of the first frame 210. The first surface of the housing 100 and the first surface of the first frame 210 may be arranged to oppose each other.

The second driving units 400 and 500 may be configured to move the movable body 200 in the first and second directions, that intersect the optical axis. For example, the second driving units 400 and 500 may provide the driving force necessary for movement of the second frame 220 and the third frame 230. The respective second driving units 400 and 500 may include respective second driving coils 410 and 510 and respective second driving magnets 420 and 520. In a non-limiting example, the second driving coils 410 and 510 may be arranged on respective second and third surfaces of the housing 100, and the respective second driving magnets 420 and 520 may be arranged on respective second and third surfaces of the third frame 230. In an example, the second surface of the housing 100 may be a surface opposing the second surface of the third frame 230, and the third surface of the housing 100 may be a surface opposing the third surface of the third frame 230.

The camera module 10 may include a device that supplies a current to the driving units 300, 400, and 500. In an example, the camera module 10 may include the substrate 120. The substrate 120 may be configured to supply a current necessary for driving the first driving unit 300 and the second driving units 400 and 500. In an example, the substrate 120 may supply a current to the first driving coil 310 and the second driving coils 410 and 510. The substrate 120 may be configured to provide a space or an area in which the first driving coil 310 and the second driving coils 410 and 510 are arranged. In an example, the substrate 120 may be disposed to surround the first surface, the second surface, and the third surface of the housing 100, to provide a space or an area in which the first driving coil 310 and the second driving coils 410 and 510 are arranged in the housing 100. The yoke 140 may be disposed on one side of the substrate 120.

The camera module 10 may include a device that detects a position of the movable body 200. In an example, the camera module 10 may include a plurality of position detecting sensors 610, 620, and 630. A first position detecting sensor 610 may detect a displacement in movement of the movable body 200 in a direction of the optical axis, and a second position detecting sensor 620 and a third position detecting sensor 630 may detect a displacement in movement of the movable body 200 in a direction that intersects the optical axis. In a non-limiting example, the position detecting sensors 610, 620, and 630 may be implemented in the form of hall sensors that detect a magnitude of a magnetic field generated from the driving units 300, 400, and 500. Shapes of the position detecting sensor 610, 620, and 630 are not limited to the hall sensor. The position detecting sensors 610, 620, and 630 may be respectively disposed in a space or an area surrounded by the respective driving coils 310, 410, and 510. In an example, the first position detecting sensor 610 may be disposed inside the first driving coil 310, and the second position detecting sensor 620 and the third position detecting sensor 630 may be respectively disposed inside the second driving coils 410 and 510.

The camera module 10 may include a device that binds the first frame 210 to the third frame 230. In an example, the camera module 10 may include the cover member 700 that binds the second frame 220 and the third frame 230 to the first frame 210. The cover member 700 may be coupled to the first frame 210 in a manner in which the first frame 210 to the third frame 230 are stacked, to prevent the second frame 220 and the third frame 230 from being released from the first frame 210. One or more buffer members 830 may be formed in the cover member 700. In an example, a plurality of buffer members 830, protruding in an upward direction, may be formed in an upper portion of the cover member 700. The one or more buffer members 830, formed as described above, may reduce impacts due to collisions between the movable body 200 and the shield can 900.

The camera module 10 may include a shielding member that shields the camera module from electromagnetic waves. In an example, the camera module 10 may include the shield can 900. The shield can 900 may be formed to have a shape that surrounds the housing 100, the movable body 200, and the cover member 700. Therefore, the intrusion or emission of harmful electromagnetic waves generated inside or outside the camera module 10 may be blocked by the shield can 900.

The camera module 10 may further include a configuration that improves the rigidity and movement stability of the movable body 200. In an example, the camera module 10 may further include a reinforcing member 810. The reinforcing member 810 will be described in detail with reference to FIGS. 3 to 5.

Figure 3:
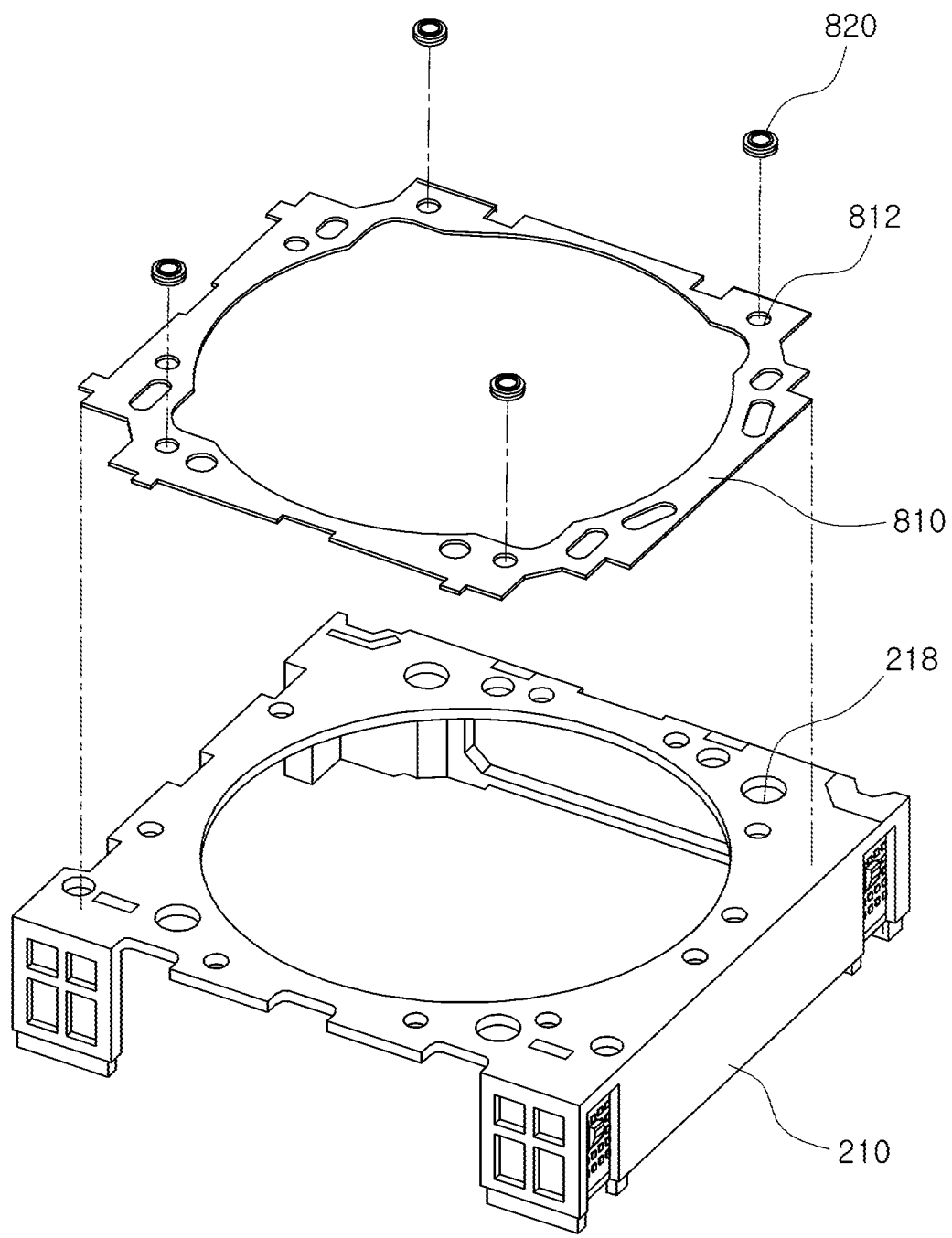
FIG. 3 is an exploded perspective view of the first frame illustrated in FIG. 2.

The reinforcing member 810 may be integrally formed on the movable body 200. In an example, the reinforcing member 810 may be formed as a metal material, and may be integrally formed on the first frame 210 of the movable body 200, which may be a plastic material. A method of forming the reinforcing member 810 may use an injection molding process. However, this is a non-limiting example, and the method of forming the reinforcing member 810 is not limited to the injection molding process. The reinforcing member 810 may be formed to have substantially the same or a similar shape as the shape of a bottom surface of the first frame 210, as illustrated in FIG. 3. The reinforcing member 810 may be formed inside the bottom surface of the first frame 210 to improve rigidity of the first frame 210. Therefore, even when a thickness of the bottom surface of the first frame 210 is relatively thin, rigidity of the first frame 210 may be sufficiently secured by the reinforcing member 810.

One or more buffer members 820 may be formed in the reinforcing member 810. In an example, the one or more buffer members 820 may be formed at four corner portions of the reinforcing member 810. One or more fastening holes 812, into which the one or more buffer members 820 is fitted, may be formed in the reinforcing member 810. The one or more buffer members 820 may be fitted into the one or more fastening holes 812 in a forced fitting manner or may be formed to be integrated with the reinforcing member 810 by an injection molding process. The one or more buffer members 820 may reduce impacts applied to the first frame 210. For example, the one or more buffer members 820 may reduce impact energy due to collisions between the first frame 210 and the housing 100. In an example, one or more holes 218 that expose the buffer member 820 externally, may be formed in the first frame 210.

Figure 4:
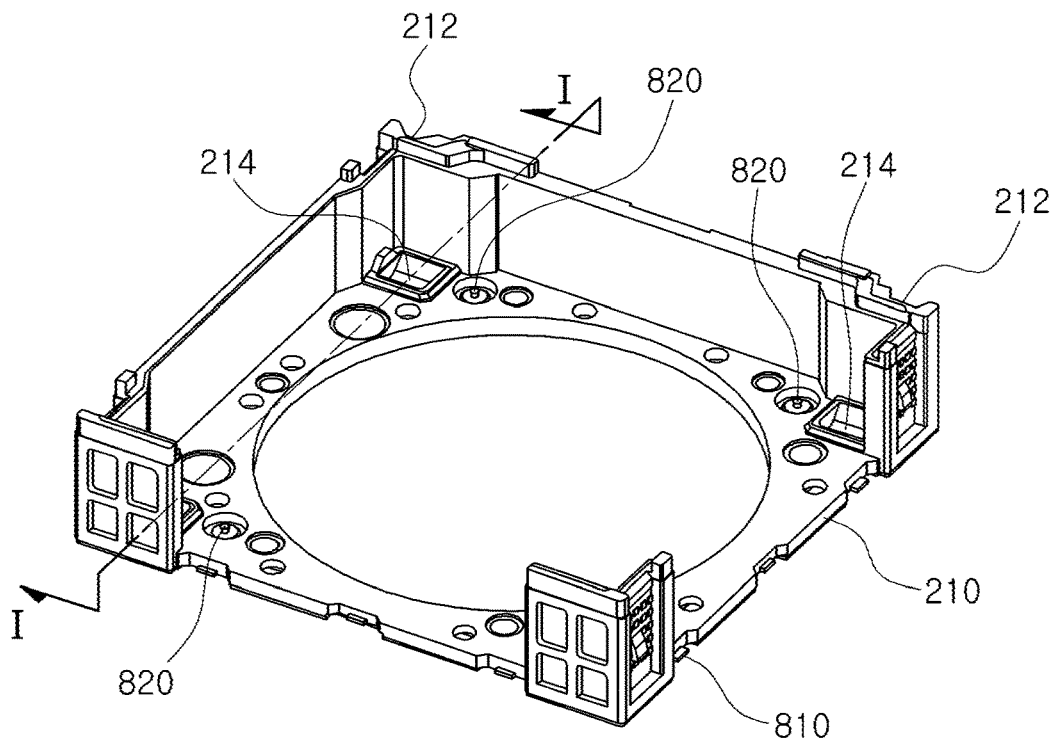
FIG. 4 is an assembled perspective view of the first frame illustrated in FIG. 3.
Figure 5:
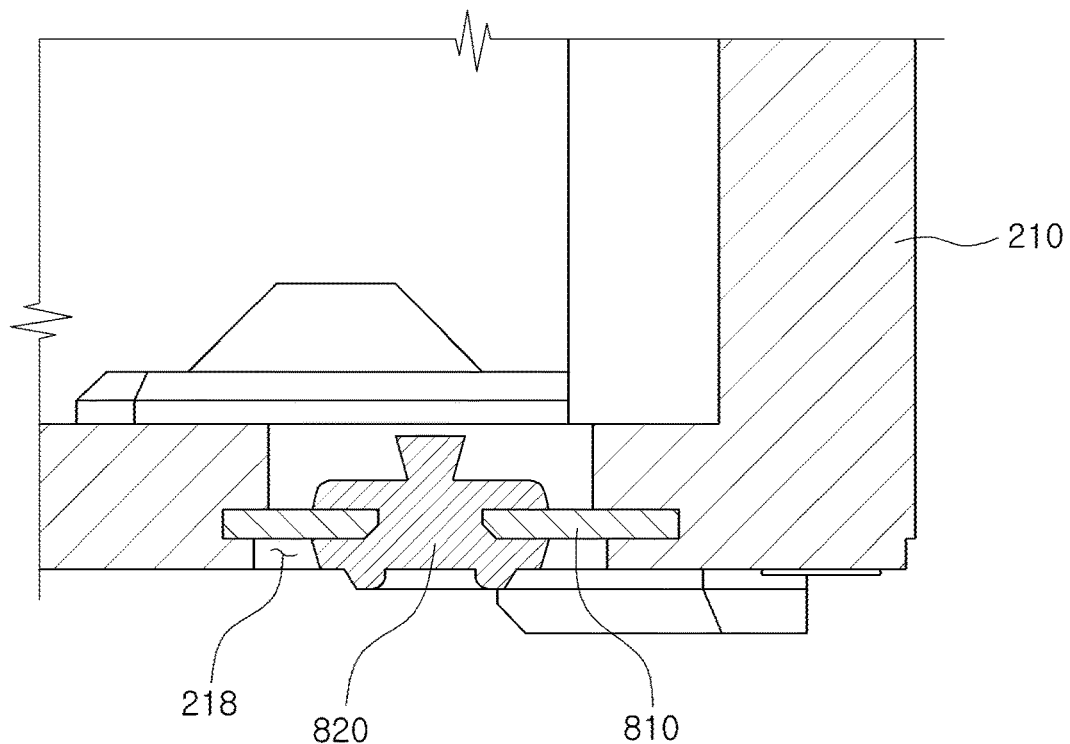
FIG. 5 is a cross-sectional view of the first frame illustrated in FIG. 4.

FIGS. 4 and 5 are enlarged perspective and partial cross-sectional views of the first frame 210 on which the reinforcing member 810 is integrally formed.

The reinforcing member 810 may be integrally formed on the bottom surface of the first frame 210. A portion of the reinforcing member 810 may protrude from the first frame 210 externally. In a non-limiting example, the reinforcing member 810 may be formed of a non-magnetic material, not to be affected by a driving unit.

The one or more buffer members 820 may be configured to protrude from the first frame 210 in a downward direction, as illustrated in FIG. 5. For example, the buffer member 820 may be formed to protrude through the hole 218 of the first frame 210 in a downward direction. The one or more buffer members 820 may be fixed to the first frame 210 by the reinforcing member 810. For example, the one or more buffer members 820 may be fixed by the reinforcing member 810 that is fixed inside the first frame 210, to not be separated from the first frame 210. The reinforcing member 810 and the buffer member 820 may be configured to absorb external impacts. In an example, the external impacts applied to the buffer member 820 may be alleviated primarily by plastic deformation of the one or more buffer members 820, and may be alleviated secondarily by bending deformation of the reinforcing member 810.

Figure 6:
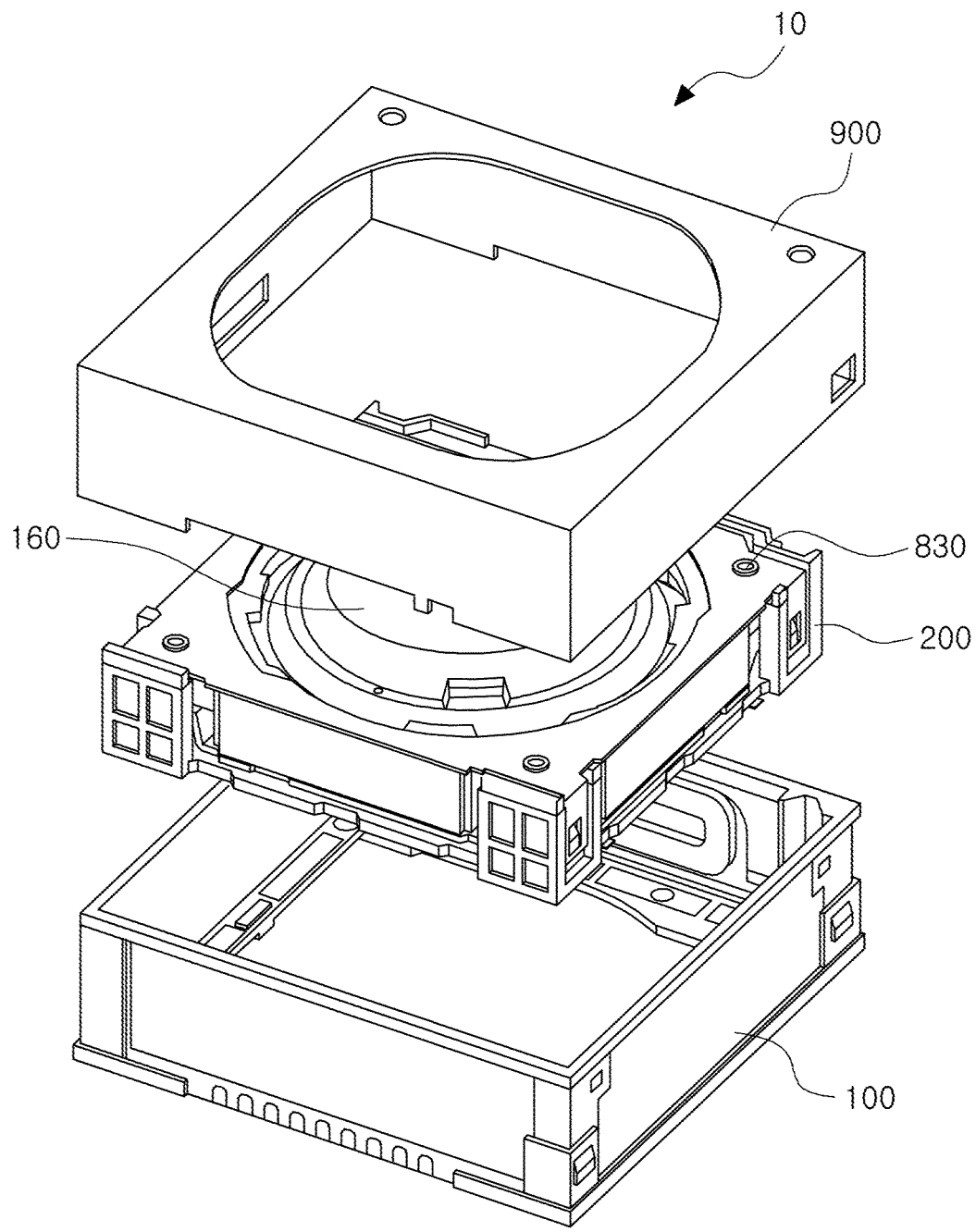
FIG. 6 is a partially assembled perspective view of the example camera module illustrated in FIG. 1.
Figure 7:
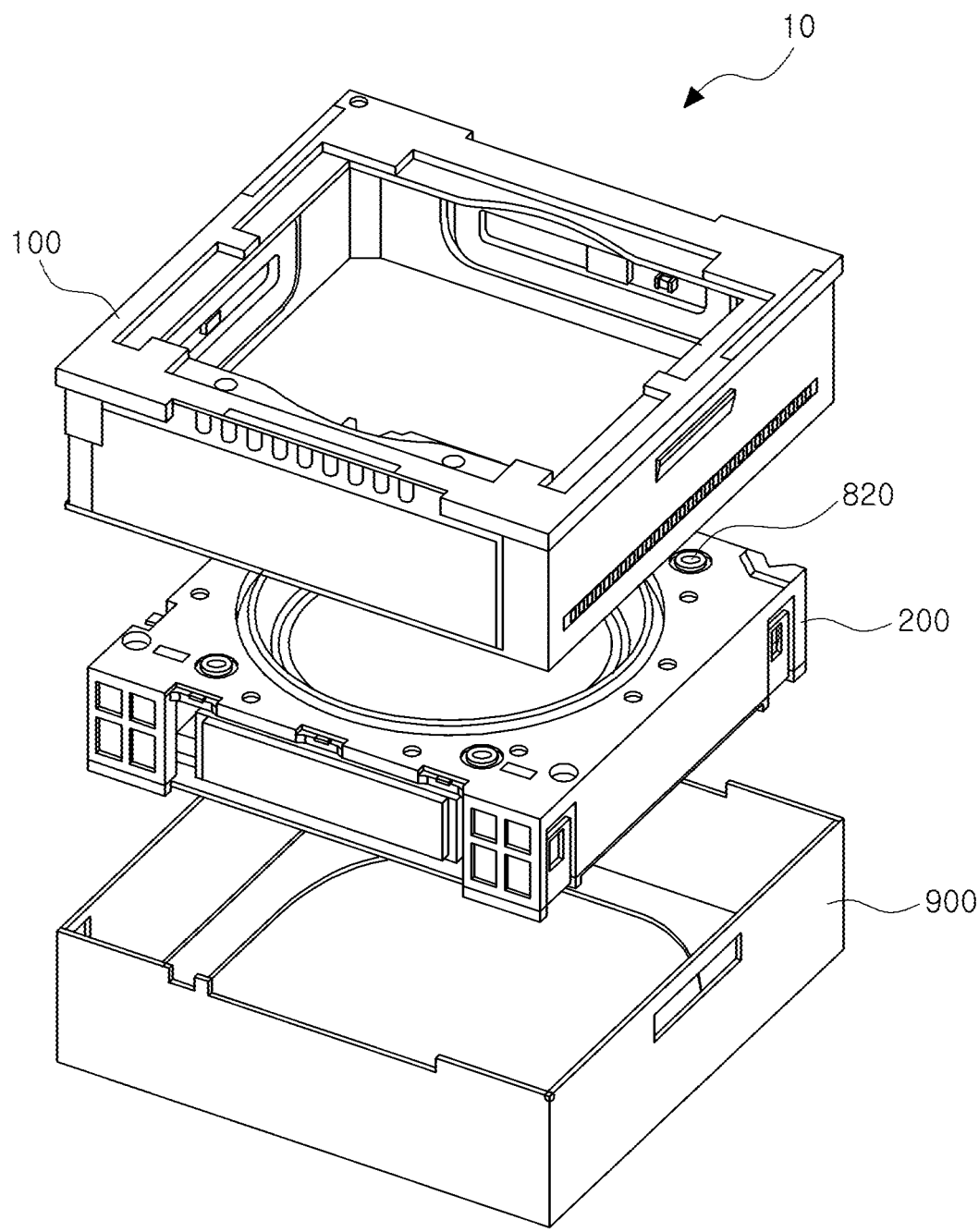
FIG. 7 is a bottom perspective view of the example camera module illustrated in FIG. 6.

Functions of the buffer members 820 and 830 will be described with reference to FIGS. 6 and 7.

The buffer members 820 and 830 may be configured to reduce impacts applied to the movable body 200. In an example, the buffer member 830 may be formed to protrude in an upward direction, to reduce impacts with the shield can 900 due to rapid movement of the movable body 200 in an upward direction, and the one or more buffer members 820 may be formed to protrude in a downward direction, to reduce impacts with the housing 100 due to rapid movement of the movable body 200 in a downward direction.

Figure 8:
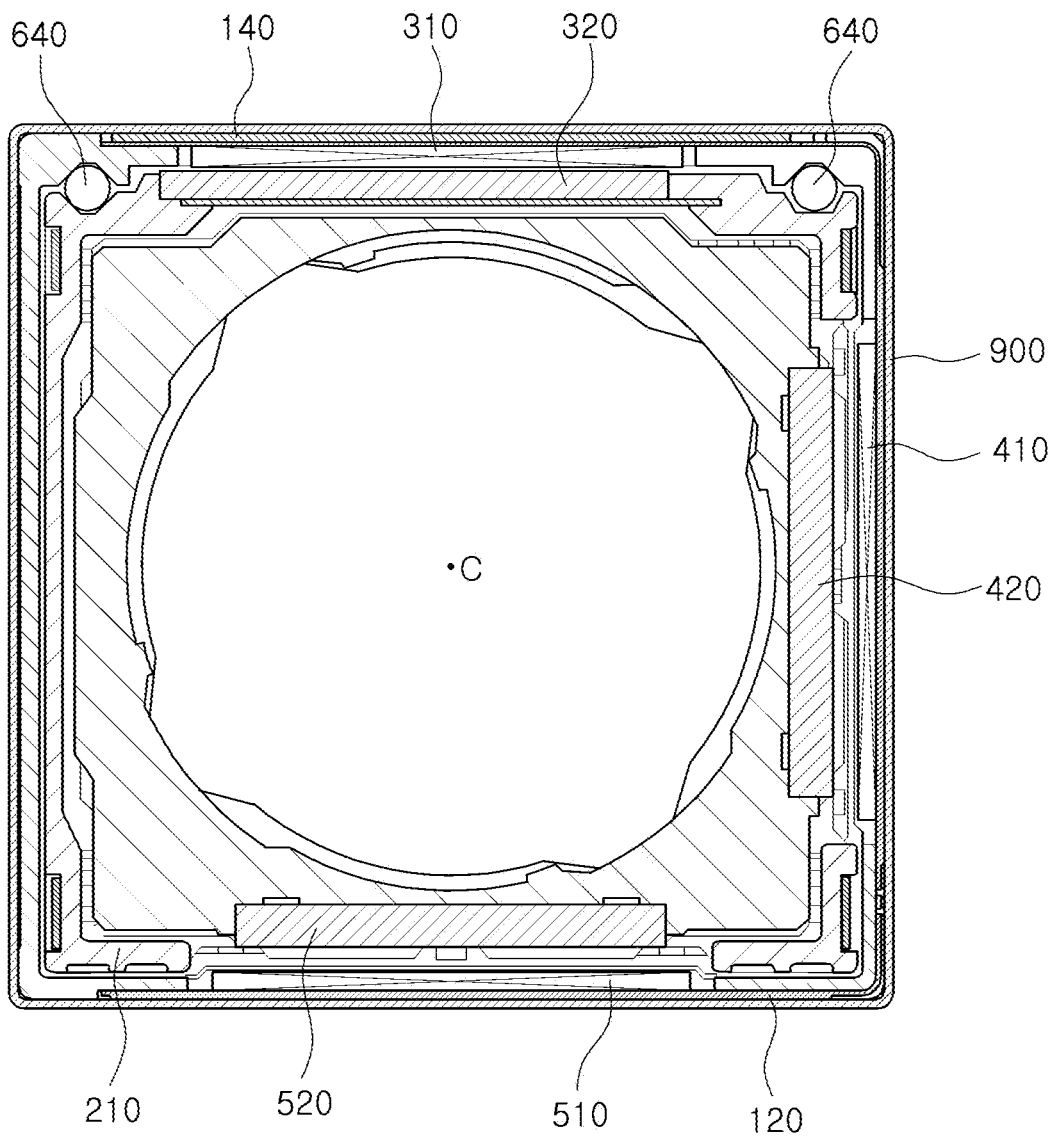
FIG. 8 is a cross-sectional view of the camera module illustrated in FIG. 1.

Next, an arrangement of the movable body 200 and the driving units 300, 400, and 500 will be described with reference to FIG. 8.

The driving units 300, 400, and 500 may be sequentially disposed on the first to third surfaces of the housing 100 around the movable body 200. For example, the first driving unit 300 may be disposed on the first surface of the housing 100, and the first surface of the first frame 210, the second driving unit 400 may be disposed on the second surface of the housing 100 and the second surface of the third frame 230, and the second driving unit 500 may be disposed on the third surface of the housing 100 and the third surface of the third frame 230.

The movable body 200 may be moved in a direction of the optical axis and in a direction intersecting the optical axis by the driving units 300, 400, and 500. For example, the movable body 200 may be moved in a direction of the optical axis (C-C) by the first driving unit 300 (i.e., 310 and 320). As another example, at least one of the second frame 220 and the third frame 230 of the movable body 200 may move in the first and second directions, intersecting the optical axis, by combined force of the second driving units 400 and 500 (i.e., 410, 420, 510, and 520).

Next, moving structures of the second frame 220 and the third frame 230 will be described with reference to FIGS. 9 and 10.

Figure 9:
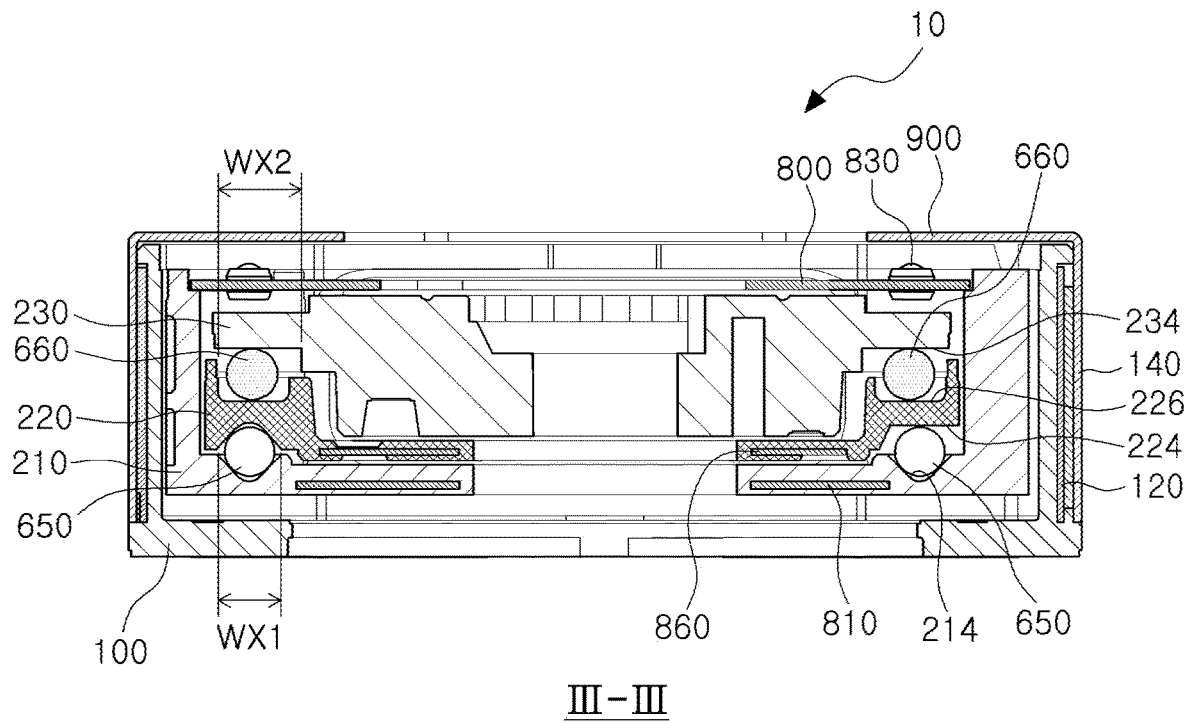
FIGS. 9 and 10 are cross-sectional views of the movable body illustrated in FIG. 4.

The first frame 210, the second frame 220, and the third frame 230, that constitute the movable body 200, may be stacked, and coupled in a direction of the optical axis, as illustrated in FIG. 9. The first frame 210 may be configured to accommodate the second frame 220 and the third frame 230. In an example, the second frame 220 and the third frame 230, accommodated inside the first frame 210, may be configured to move in a direction that intersects the optical axis.

The ball bearings 650 and 660 may be arranged between the first frame 210 to the third frame 230. In an example, the second ball bearing 650 may be disposed between the first frame 210 and the second frame 220, and the third ball bearing 660 may be disposed between the second frame 220 and the third frame 230.

Spaces for disposing the ball bearings may be formed in the first frame 210 to the third frame 230. For example, the first groove 214 may be formed in an upper portion of the first frame 210, the second grooves 224 and 226 may be respectively formed in upper and lower portions of the second frame 220, and the third groove 234 may be formed in a lower portion of the third frame 230.

Distances of the grooves 224 and 234 respectively formed the lower portions of the second frame 220 and the third frame 230 may be formed differently, depending on respective moving directions of the second frame 220 and the third frame 230. In an example, a distance (WY2) of the groove 224 in the first direction may be greater than a distance (WX1) of the groove 224 in the second direction, and a distance (WX2) of the groove 234 in the second direction may be greater than a distance (WY1) of the groove 234 in the first direction. Additionally, the distance (WY2) of the groove 224 in the first direction may be greater than a distance (WY1) of each of the grooves 214, 226, and 234 in the first direction, and the distance (WX2) of the groove 234 in the second direction may be greater than a distance (WX1) of each of the grooves 214, 224, and 226 in the second direction.

Since a distance of the groove 224 of the second frame 220, configured as described above, in the first direction may be greater than a distance of the groove 214 of the first frame 210 in the first direction, movement of the second frame 220 relative to the first frame 210 is possible. Additionally, since a distance of the grooves 234 of the third frame 230 in the second direction may be greater than a distance of the grooves 226 of the second frame 220 in the second direction, movement of the third frame 230 relative to the second frame 220 is possible.

Figure 10:
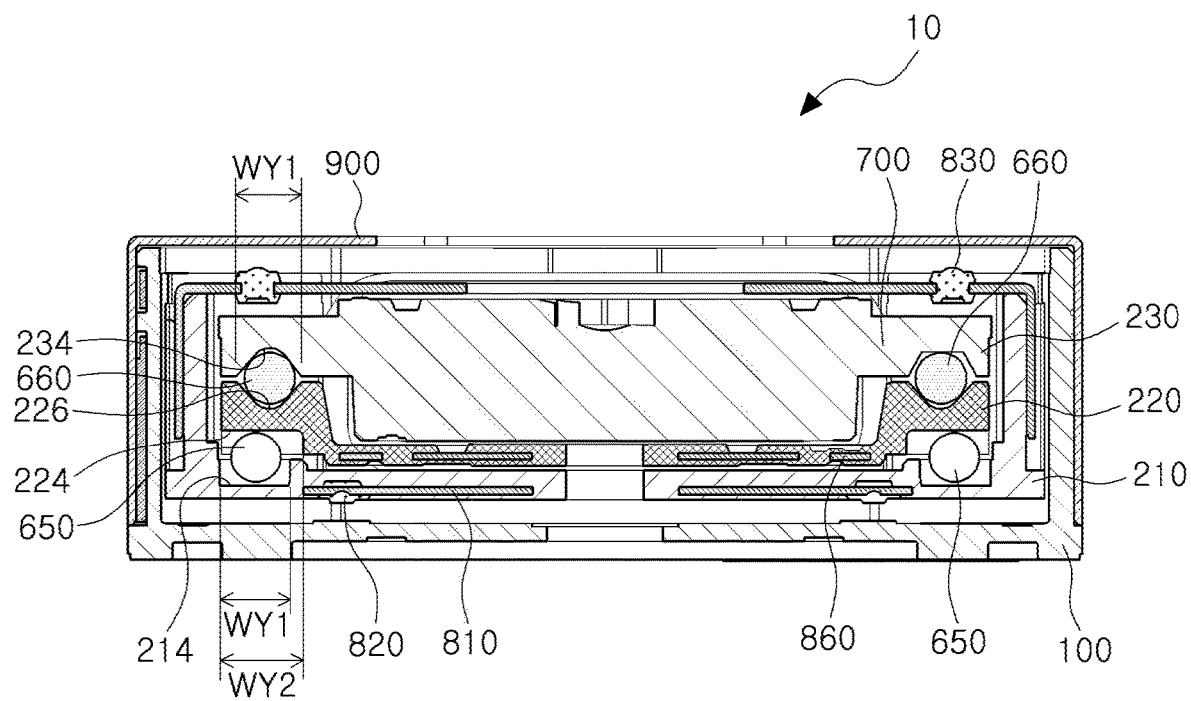
Figure 11:
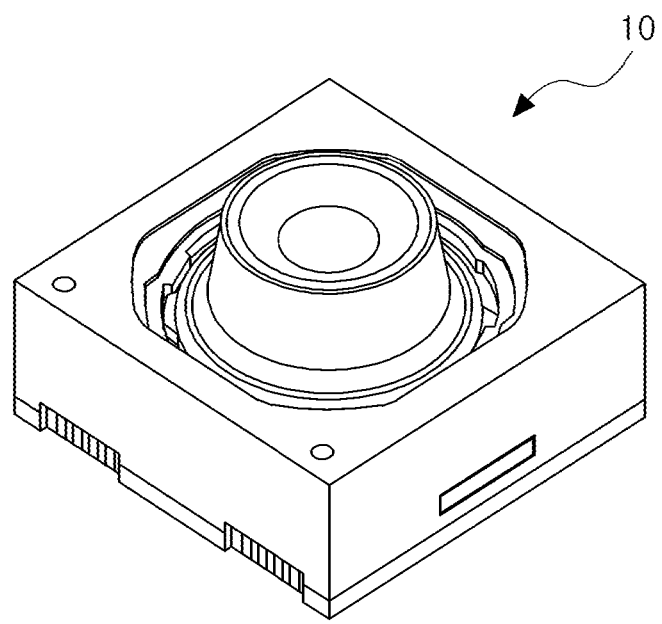
FIG. 11 is a perspective view of an example camera module, in accordance with one or more embodiments.

The second frame 220 may include a reinforcing member 860, as illustrated in FIGS. 9 and 10. In an example, a reinforcing member 860, that reinforces the strength of the second frame 220, may be integrally formed on a bottom of the second frame 220.

Next, an example camera module, in accordance with one or more embodiments, will be described with reference to FIGS. 11 to 15. In an example, since a driving structure of an camera module in accordance with this example embodiment may be the same as the example camera module in accordance with the above-described example embodiment, a detailed description of the driving structure of the camera module will be omitted.

Figure 12:
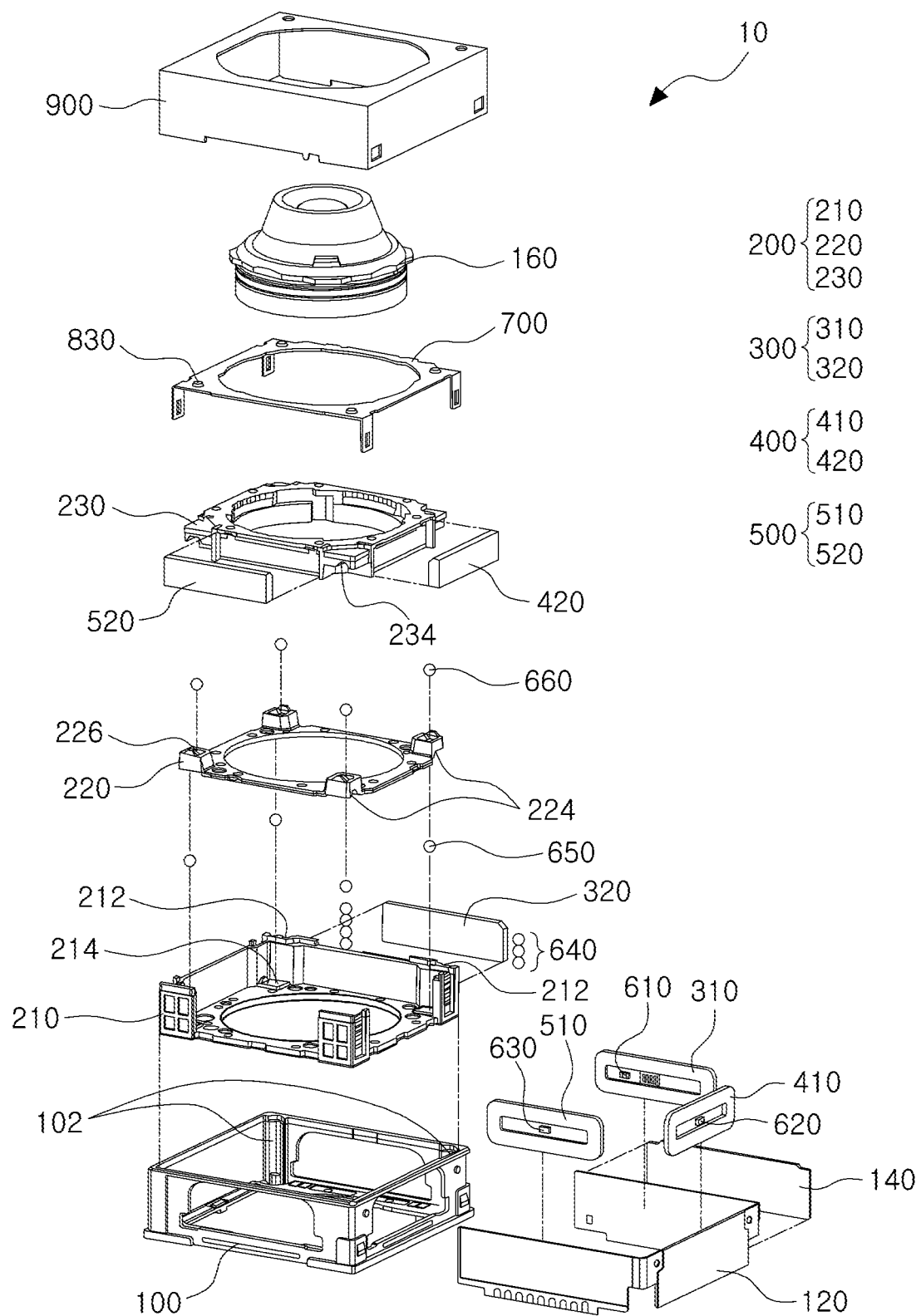
FIG. 12 is an exploded perspective view of the example camera module illustrated in FIG. 11.
Figure 13:
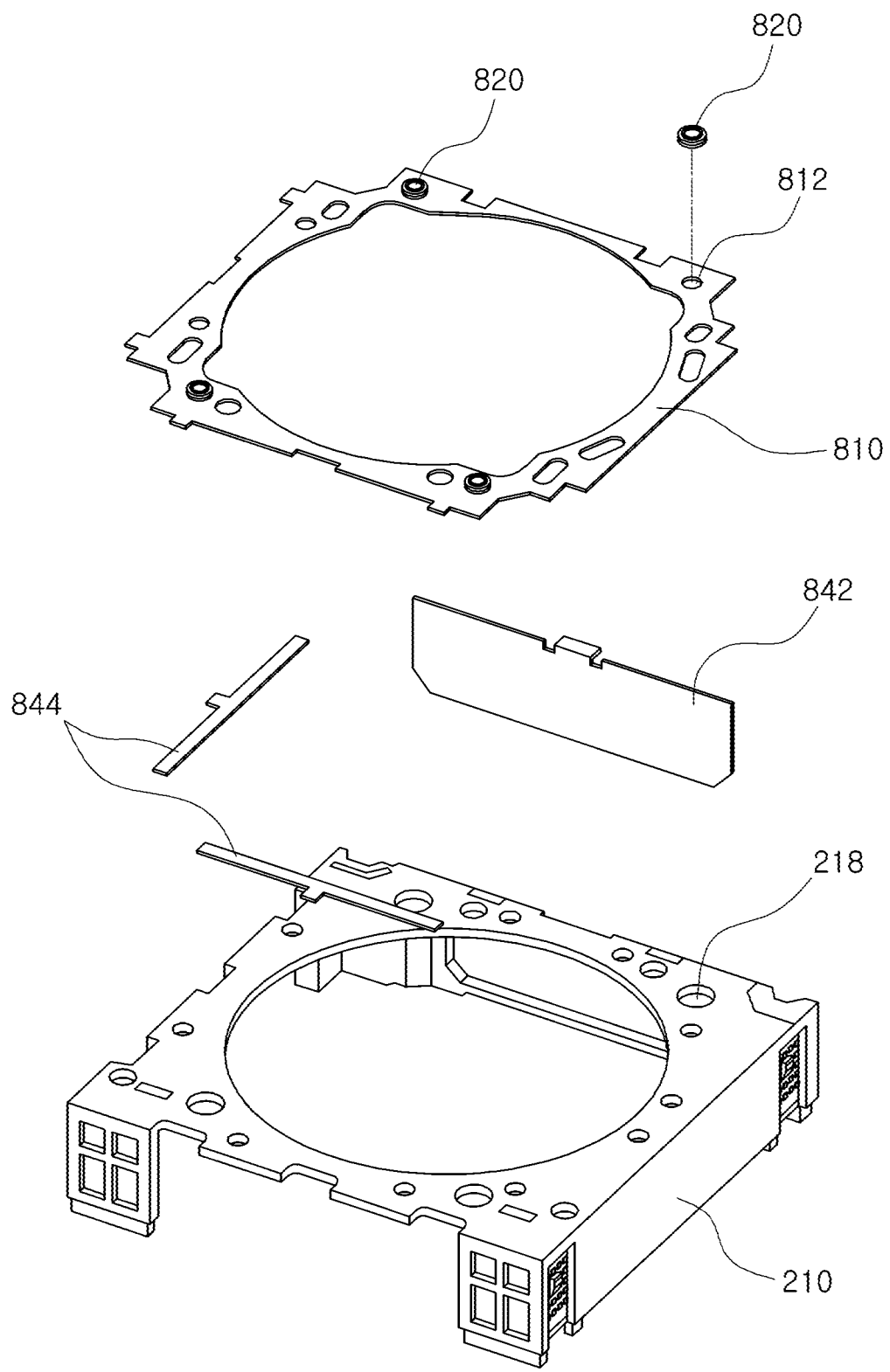
FIG. 13 is an exploded perspective view of the first frame illustrated in FIG. 12.

Referring to FIG. 12, the camera module 10 may include a housing 100, a lens barrel 160, a movable body 200, a first driving unit 300, and second driving units 400 and 500. A configuration of the example camera module 10 is not limited to the above-mentioned members. In an example, the camera module 10 may further include a substrate 120, a yoke 140, a position detecting sensor 610, 620, and 630, ball bearings 640, 650, and 660, a cover member 700, a reinforcing member 810, and a shield can 900.

In a non-limiting example, the housing 100 may be formed as a cube having open upper and lower surfaces. In an example, the housing 100 may be configured in a substantially hexahedral shape. Three (3) side surfaces of the housing 100 may be partially incised. Driving forces of the first driving unit 300 and the second driving units 400 and 500 may be transmitted to the movable body 200 through the incised side surfaces. A pair of first guide grooves 102 may be formed inside a first surface of the housing 100. The first guide groove 102 may be formed to be elongated in a height direction of the housing 100. A first ball bearing 640 may be disposed in the first guide groove 102.

The movable body 200 may be disposed inside the housing 100. The movable body 200 may be configured to move in a direction of an optical axis and in a direction that intersects the optical axis within the housing 100. The movable body 200 may be comprised of a plurality of members. In an example, the movable body 200 may be comprised of a first frame 210, a second frame 220, and a third frame 230.

The first frame 210 may be formed to be open in a vertical direction and to have two (2) closed side surfaces and two (2) open side surfaces. A pair of second guide grooves 212 may be formed on a first surface of the first frame 210. The first ball bearing 640 may be disposed in the second guide groove 212. The first frame 210 may be disposed inside the housing 100. The first frame 210 may be configured to move in a direction of an optical axis with respect to the housing 100. For example, the first frame 210 may be in point contact with, or in line contact with, the first ball bearing 640 to move in a direction of the optical axis. A driving force necessary to drive the first frame 210 may be provided by the first driving unit 300. A first groove 214 may be formed in four (4) internal corners of the first frame 210. The first groove 214 may have a shape having a longitudinal direction. In an example, the first groove 214 may be formed to be elongated in a first direction, that intersects the optical axis. A second ball bearing 650 may be disposed in the first groove 214.

The second frame 220 may have a generally thin plate shape in which the vertical direction is open. The second frame 220 may be disposed on the first frame 210, and may be configured to move in the first direction, that intersects the optical axis. In an example, the second frame 220 may move in the first direction, that intersects the optical axis based on the second ball bearing 650 disposed between the first frame 210 and the second frame 220. A driving force necessary to drive the second frame 220 may be provided by the second driving unit 400. A second groove 224 and a third groove 226 may be formed in the second frame 220. The second groove 224 may be formed in a lower portion of the second frame 220, and the third groove 226 may be formed in an upper portion of the second frame 220. The second groove 224 may be formed to be elongated in the first direction, that intersects the optical axis. The second groove 224 may form a space to accommodate the second ball bearing 650, together with the first groove 214. The third groove 226 may be formed to be elongated in a second direction, that intersects the optical axis and the first direction.

The third frame 230 may be formed to be open in the vertical direction, and to have a predetermined height. The third frame 230 may be disposed on the second frame 220, and may be configured to move in the second direction, that intersects the optical axis. In an example, the third frame 230 may move in a second direction, that intersects the optical axis based on a third ball bearing 660 disposed between the second frame 220 and the third frame 230. A driving force necessary to drive the third frame 230 may be provided by the second driving unit 400. A fourth groove 234 may be formed in a lower portion of the third frame 230. The fourth groove 234 may be formed to be elongated in the second direction, that intersects the optical axis. The fourth groove 234 may form a space that accommodates the third ball bearing 660, together with the third groove 226.

The lens barrel 160 may be combined with the third frame 230. The lens barrel 160 may be moved by the movable body 200 in a direction of the optical axis and in a direction that intersects the optical axis. In an example, the lens barrel 160 may move in a direction of the optical axis by the first frame 210. As another example, the lens barrel 160 may move in the first and second directions, intersecting the optical axis, based on the second frame 220 and the third frame 230. Movement of the lens barrel 160 in a direction of the optical axis may enable focus adjustment of the camera module 10, and movement of the lens barrel 160 in a direction that intersects the optical axis of the camera module 10 may allow for an optical image stabilization (OIS) function of the camera module 10.

The first driving unit 300 may be configured to move the movable body 200 in a direction of the optical axis. In an example, the first driving unit 300 may provide a driving force necessary to move the first frame 210 in a direction of the optical axis. The first driving unit 300 may include a first driving coil 310 and a first driving magnet 320. The first driving coil 310 may be disposed on the first surface of the housing 100, and the first driving magnet 320 may be disposed on the first surface of the first frame 210. The first surface of the housing 100 and the first surface of the first frame 210 may be arranged to oppose each other.

The second driving units 400 and 500 may be configured to move the movable body 200 in the first and second directions, that intersect the optical axis. In an example, the second driving units 400 and 500 may provide driving forces necessary for movement of the second frame 220 and the third frame 230. The second driving units 400 and 500 may include respective second driving coils 410 and 510 and second driving magnets 420 and 520. The second driving coils 410 and 510 may be arranged on respective second and third surfaces of the housing 100, and the second driving magnets 420 and 520 may be respectively arranged on second and third surfaces of the third frame 230. In an example, the second surface of the housing 100 may be a surface opposing the second surface of the third frame 230, and the third surface of the housing 100 may be a surface opposing the third surface of the third frame 230.

The camera module 10 may include for a device that supplies a current to the driving units 300, 400, and 500. In an example, the camera module 10 may include the substrate 120. The substrate 120 may be configured to supply a current necessary to drive the first driving unit 300 and the second driving units 400 and 500. In an example, the substrate 120 may supply the current to the first driving coil 310 and the second driving coils 410 and 510. The substrate 120 may be configured to provide a space or an area in which the first driving coil 310 and the second driving coils 410 and 510 are arranged. In an example, the substrate 120 may be disposed to surround the first surface, the second surface, and the third surface of the housing 100, to provide a space in which the first driving coil 310 and the second driving coils 410 and 510 are arranged in the housing 100. The yoke 140 may be disposed on one side of the substrate 120.

The camera module 10 may include one or more detecting devices that detect a position of the movable body 200. In an example, the camera module 10 may include a plurality of position detecting sensors 610, 620, and 630. A first detecting sensor 610 may detect a displacement in movement of the movable body 200 in a direction of the optical axis, and a second position detecting sensor 620 and a third position detecting sensor 630 may detect a displacement in movement of the movable body 200 in a direction that intersects the optical axis. The position detecting sensors 610, 620, and 630 may be in the form of hall sensors detecting a magnitude of magnetic field generated from the driving units 300, 400, and 500. Shapes of the position detecting sensor 610, 620, and 630 are not limited to the hall sensor. The position detecting sensors 610, 620, and 630 may be respectively disposed in a space respectively surrounded by the driving coils 310, 410, and 510. In an example, the first position detecting sensor 610 may be disposed inside the first driving coil 310, and each of the second position detecting sensor 620 and the third position detecting sensor 630 may be disposed inside each of the second driving coils 410 and 510.

The camera module 10 may include a device that binds the first frame 210 to the third frame 230. In an example, the camera module 10 may include the cover member 700 that binds the second frame 220 and the third frame 230 to the first frame 210. The cover member 700 may be coupled to the first frame 210 in a state in which the first frame 210 to the third frame 230 are stacked, to prevent the second frame 220 and the third frame 230 from being released from the first frame 210. A buffer member 830 may be formed in the cover member 700. In an example, a plurality of buffer members 830, protruding in an upward direction, may be formed in an upper portion of the cover member 700. The buffer member 830, formed as described above, may reduce impacts due to collisions between the movable body 200 and the shield can 900.

The camera module 10 may include a device that shields the camera module 10 from electromagnetic waves. For example, the camera module 10 may include the shield can 900. The shield can 900 may be formed to have a shape surrounding the housing 100, the movable body 200, and the cover member 700. Therefore, intrusion or emission of harmful electromagnetic waves generated inside or outside the camera module 10 may be blocked by the shield can 900.

The camera module 10 may further include a configuration that improves rigidity and movement stability of the movable body 200. In an example, the camera module 10 may further include the reinforcing member 810 and an auxiliary yoke 840. The reinforcing member 810 and the auxiliary yoke 840 will be described in detail with reference to FIGS. 13 to 15.

The reinforcing member 810 may be integrally formed on the movable body 200. In an example, the reinforcing member 810 may be formed of a metal material, and may be integrally formed on the first frame 210 of the movable body 200, which, in a non-limiting example, may be formed of a plastic material. The reinforcing member 810 may be formed by an injection molding process. However, this is only an example, and the reinforcing member 810 may be formed by processes that are not limited to the injection molding process. The reinforcing member 810 may be formed to have substantially the same, or a similar shape as, a bottom surface of the first frame 210, as illustrated in FIG. 3. In an example, the reinforcing member 810 may be formed inside the bottom surface of the first frame 210 to improve rigidity of the first frame 210. Therefore, even when a thickness of the bottom surface of the first frame 210 is relatively thin, rigidity of the first frame 210 may be sufficiently secured by the reinforcing member 810.

One or more buffer members 820 may be formed in the reinforcing member 810. In an example, the one or more buffer members 820 may be formed at four corner portions of the reinforcing member 810. A fastening hole 812 into which the one or more buffer members 820 is fitted may be formed in the reinforcing member 810. The one or more buffer members 820 may be fitted into the one or more fastening holes 812 in a forced fitting manner or may be formed to be integrated with the reinforcing member 810 by an injection molding process. The one or more buffer members 820 may reduce impacts applied to the first frame 210. For example, the one or more buffer members 820 may reduce impact energy due to collision between the first frame 210 and the housing 100. For reference, a hole 218 exposing the one or more buffer members 820 externally may be formed in the first frame 210.

The auxiliary yoke 840 (i.e., 842 and 844) may be disposed on the first to third surfaces of the first frame 210. In an example, a first auxiliary yoke 842 may be disposed on the first surface of the first frame 210, and a second auxiliary yoke 844 may be disposed on the second and third surfaces of the first frame 210, respectively. The auxiliary yoke 840 may be formed to be elongated in a direction in which a driving force of the driving units 300, 400, and 500 acts. In an example, the first auxiliary yoke 842 may be formed to be elongated in a direction of the optical axis, and the second auxiliary yoke 844 may be formed to be elongated in the first direction and the second direction, that intersect the optical axis, respectively. The auxiliary yoke 840 may be formed of a magnetic material to improve driving force of a driving unit.

Figure 14:
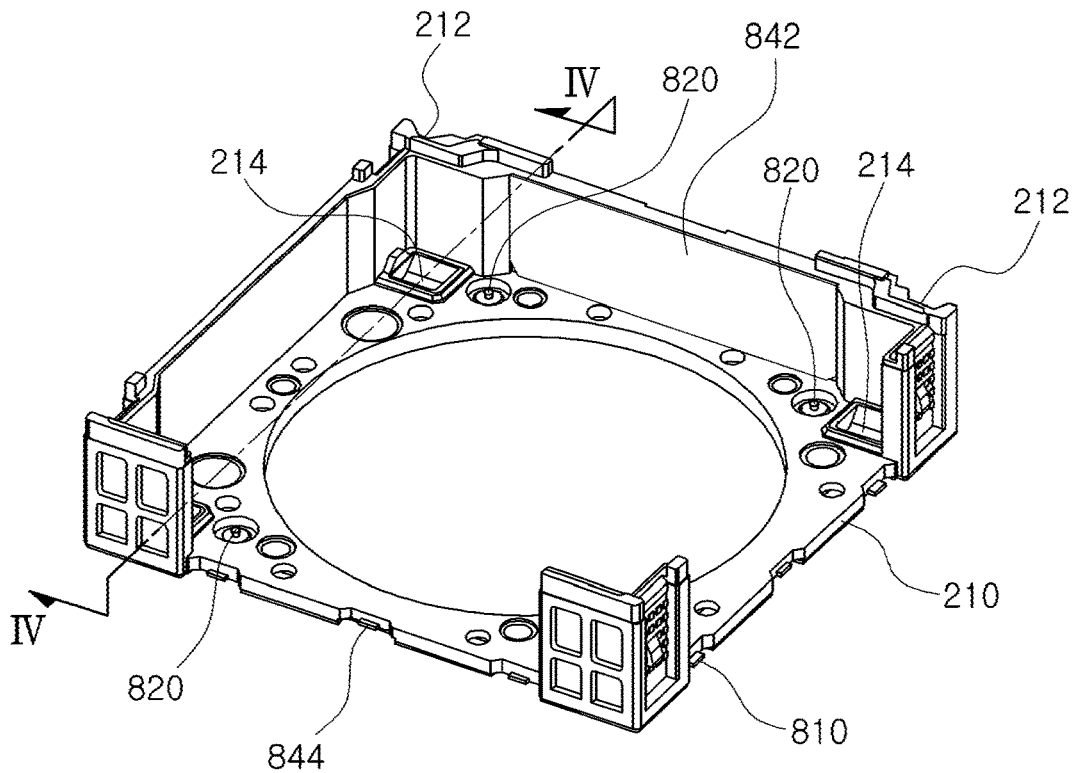
FIG. 14 is an assembled perspective view of the first frame illustrated in FIG. 13.
Figure 15:
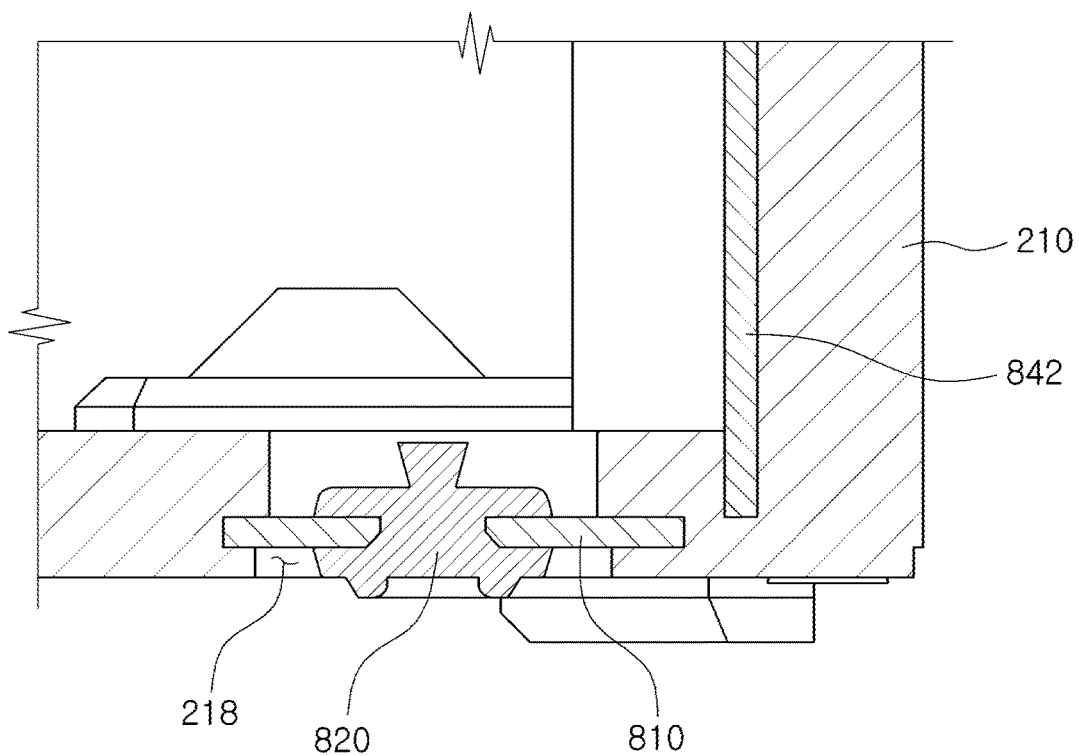
FIG. 15 is a cross-sectional view of the first frame illustrated in FIG. 14.

FIGS. 14 and 15 are enlarged perspective and partial cross-sectional views of the first frame 210 in which the reinforcing member 810 is integrally formed.

The reinforcing member 810 may be integrally formed on the bottom surface of the first frame 210. A portion of the reinforcing member 810 may protrude from the first frame 210 externally. The auxiliary yoke 840 may interact with a portion of the driving units 300, 400, and 500. In an example, the auxiliary yoke 840 may interact with the driving coils 310, 410, and 510 to maintain the first frame 210 in a stable position inside the housing 100.

The one or more buffer members 820 may be configured to protrude from the first frame 210 in a downward direction, as illustrated in FIG. 15. For example, the one or more buffer members 820 may be formed to protrude through the one or more holes 218 of the first frame 210 in a downward direction. The one or more buffer members 820 may be fixed to the first frame 210 by the reinforcing member 810. In an example, the one or more buffer members 820 may be fixed by the reinforcing member 810 fixed inside the first frame 210, not to be separated from the first frame 210. The reinforcing member 810 and the one or more buffer member 820s may be configured to absorb external impacts. For example, the external impacts applied to the one or more buffer members 820 may be alleviated primarily by plastic deformation of the one or more buffer members 820, and may be alleviated secondarily by bending deformation of the reinforcing member 810.

The examples may reduce the internal noise of the camera module due to an external shock and the failure or damage phenomenon of the camera module.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a housing;
a movable body, configured to move in a direction of an optical axis of the housing;
an auxiliary yoke formed integrally on the movable body and elongated in the direction of the optical axis, and configured to interact with a first driving unit to move the movable body in the direction of the optical axis;
a reinforcing member formed inside a surface of the movable body adjacent to the housing, and configured to increase a rigidity of the movable body; and
a first buffer member formed in the reinforcing member, and configured to reduce an impactive force between the housing and the movable body.

2. The camera module according to claim 1, wherein a fastening hole, configured to fit the first buffer member, is formed in the reinforcing member.

3. The camera module according to claim 1, wherein the movable body comprises:
a first frame configured to move in a direction of the optical axis;
a second frame, disposed on the first frame, and configured to move in a first direction, that intersects the optical axis; and
a third frame, disposed on the second frame, and configured to move in a direction of the optical axis and in a second direction, that intersects the optical axis.

4. The camera module according to claim 3, further comprising a cover member, configured to engage with the first frame when the second frame and the third frame are mounted, such that the second frame and the third frame do not deviate from the first frame.

5. The camera module according to claim 4, further comprising a second buffer member formed on the cover member.

6. The camera module according to claim 3, further comprising a ball bearing disposed between the first frame and the second frame, and disposed between the second frame and the third frame.

7. The camera module according to claim 3, further comprising:
the first driving unit, configured to move the first frame in the direction of the optical axis; and
second driving units, configured to move the second frame and the third frame in the direction that intersects the optical axis.

8. The camera module according to claim 7, wherein the first driving unit comprises:
a first driving coil disposed on a first surface of the housing; and
a first driving magnet disposed on a first surface of the first frame.

9. The camera module according to claim 8, wherein the second driving units comprise:
second driving coils respectively disposed on a second surface of the housing and a third surface of the housing; and
second driving magnets respectively disposed on a second surface of the third frame and a third surface of the third frame.

10. The camera module according to claim 9, further comprising a substrate on which the first driving coil and the second driving coil are arranged, and the substrate is configured to surround the first surface of the housing, the second surface of the housing, and the third surface of the housing.

11. A camera module comprising:
a housing;
a movable body, configured to move in a direction of an optical axis of the housing;
a first driving unit, configured to move the movable body in a direction of the optical axis;
second driving units, configured to move the movable body in first and second directions that intersect the optical axis;
an auxiliary yoke formed integrally on the movable body and elongated in the direction of the optical axis, and configured to interact with the first driving unit to move the movable body based on the first driving unit;
a reinforcing member formed inside a surface of the movable body adjacent to the housing; and
a first buffer member disposed on the surface the movable body adjacent to the housing, and configured to reduce an impactive force between the housing and the movable body.

12. The camera module according to claim 11, further comprising a first ball bearing disposed between the housing and the movable body.

13. The camera module according to claim 11, wherein the movable body comprises:
a first frame configured to move in a direction of the optical axis;
a second frame, disposed on the first frame, and configured to move in a first direction, that intersects the optical axis; and
a third frame, disposed on the second frame, and configured to move in a direction of the optical axis and in a second direction, that intersects the optical axis.

14. The camera module according to claim 13, further comprising a second buffer member disposed between the first frame and the second frame, and disposed between the second frame and the third frame.

* * * * *